(12) United States Patent
Usami

(10) Patent No.: US 6,665,007 B1
(45) Date of Patent: *Dec. 16, 2003

(54) VIDEO CAMERA SYSTEM

(75) Inventor: Makoto Usami, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,690

(22) Filed: Nov. 24, 1998

(30) Foreign Application Priority Data

Nov. 30, 1997 (JP) .............................. P9-345842
Sep. 30, 1998 (JP) ............................. P10-278597

(51) Int. Cl.[7] ...................... H04N 5/235; H04N 5/238; G06K 9/00; G06K 9/40
(52) U.S. Cl. ................... 348/223.1; 348/221.1; 348/229.1; 348/362; 348/364; 382/167; 382/274
(58) Field of Search ...................... 348/221.1–225.1, 348/229.1, 362–364; 382/167, 274

(56) References Cited

U.S. PATENT DOCUMENTS

| 5,038,205 A | | 8/1991 | Kondo et al. ................... 358/29 |
|---|---|---|---|
| 5,101,276 A | * | 3/1992 | Ohta ........................ 348/221.1 |
| 5,221,963 A | * | 6/1993 | Hashimoto et al. .......... 358/209 |
| 5,357,279 A | | 10/1994 | Nakamura et al. ........... 348/207 |
| 5,585,844 A | * | 12/1996 | Hieda et al. ................. 348/224 |
| 5,831,672 A | * | 11/1998 | Takei ......................... 348/225 |
| 6,075,562 A | * | 6/2000 | Sakaguchi et al. ........ 348/223.1 |

FOREIGN PATENT DOCUMENTS

JP            3-276976             12/1991

* cited by examiner

Primary Examiner—Andrew Christensen
Assistant Examiner—Nhan Tran
(74) Attorney, Agent, or Firm—Frommer Lawrence & Haug LLP; William S. Frommer; Gordon Kessler

(57) ABSTRACT

It is difficult to simplify the structure of a video camera system having various adjusting functions. Therefore, the video camera system has an information-obtaining-region setting function for setting an information-obtaining region in a screen according to the output of an image pickup device, an information-obtaining-region moving function for moving an information-obtaining region in the screen every predetermined cycle of the output of the image pickup device, an information-obtaining function for obtaining predetermined information-obtaining-region information based on the output of the image pickup device in the information-obtaining region every predetermined cycle, and control information generating function for generating control information in accordance with the obtained-region information obtained by an information-obtaining means.

19 Claims, 7 Drawing Sheets

VIDEO CAMERA SYSTEM

BACKGROUND OF THE INVENTION

1. Field of the Invention

The present invention relates to a video camera system to be preferably applied to a video camera having, for example, an automatic exposure (AE) adjusting function, an automatic tracing white-balance (ATW) adjusting function, and/or an automatic contrast (AK: Automatic Knee) adjusting function.

2. Description of the Related Art

Conventional automatic adjusting functions of a video camera include an automatic exposure adjusting function for automatically adjusting an exposed state to an optimum state, an automatic tracing white-balance adjusting function for automatically adjusting a white balance to an optimum state, and an automatic contrast adjusting function for automatically adjusting a contrast of a picture to an optimum state.

In this case, automatic exposure adjustment is performed by successively detecting the peak value or average value of image pickup outputs of an image pickup device for, for example, one field period and controlling the iris of an optical system so that the peak value or average value becomes equal to a preset threshold or less.

Moreover, automatic tracing white-balance adjustment is performed by obtaining the integrated value of each primary color signal for, for example, one frame period and controlling the gain of a white-balance amplifier so that the ratio of red-signal integrated value IR to green-signal integrated value IG (IR/IG) and the ratio of blue-signal integrated value IB to green-signal integrated value IG (IB/IG) always meet the following expression (that is, IR:IG:IB=1:1:1).

$$\frac{IR}{IG} = \frac{IB}{IG} = 1 \qquad (1)$$

Moreover, automatic contrast adjustment (auto-knee) is performed by detecting the peak value of intensity levels for, for example, one field period and varying so-called knee points $P_1$ and $P_2$ which are reference levels for starting the compression processing (knee processing) of a high-intensity component so that the peak value does not exceed a clip level CL as shown in FIG. 1.

A conventional video camera having various automatic adjustment functions such as the above automatic exposure adjusting function, automatic tracing white-balance adjusting function, and automatic contrast adjusting function temporarily stores video data for one frame in a frame memory so as to detect or compute control information necessary to perform various kinds of automatic adjustment processing in accordance with the video data stored in the frame memory. Therefore, this type of video camera has problems that the circuit size increases because a frame memory is necessary and thereby, it is difficult to decrease the camera in size and weight.

Moreover, to disuse a frame memory, the official gazette of Japanese Patent Application Laid-Open No. 276976/1991 discloses a method of dividing a frame screen into a plurality of regions (hereafter referred to as divided regions), simultaneously detecting the maximum value of the video data for each divided region in the same frame period by a plurality of detection circuits, and detecting or computing control information necessary to perform various kinds of automatic adjustment processing in accordance with the detection results.

However, this method has problems that a circuit for simultaneously detecting the maximum value of video data in each divided region is necessary and thereby, the circuit size increases.

SUMMARY OF THE INVENTION

In view of the foregoing, an object of this invention is to provide a video camera system having a simplified structure.

The foregoing objects and other objects of the invention have been achieved by the provision of a video camera system comprising information-obtaining-region setting means for setting an information-obtaining region in a screen in accordance with the output of an image pickup device, information-obtaining-region moving means for moving an information-obtaining region in the screen every predetermined cycle of the output of the image pickup device, information-obtaining means for obtaining predetermined obtained-region information based on the output of the image pickup device in an information-obtaining region every predetermined cycle, and control-information generating means for generating control information in accordance with the obtained-region information obtained by the information-obtaining means.

As a result, the video camera system can omit a frame memory for obtaining control information from the output of an image pickup device and a circuit for simultaneously detecting the maximum value of video data from each divided region when obtaining control information by dividing a screen and simultaneously detecting the maximum value of the video data from each divided region.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 2:
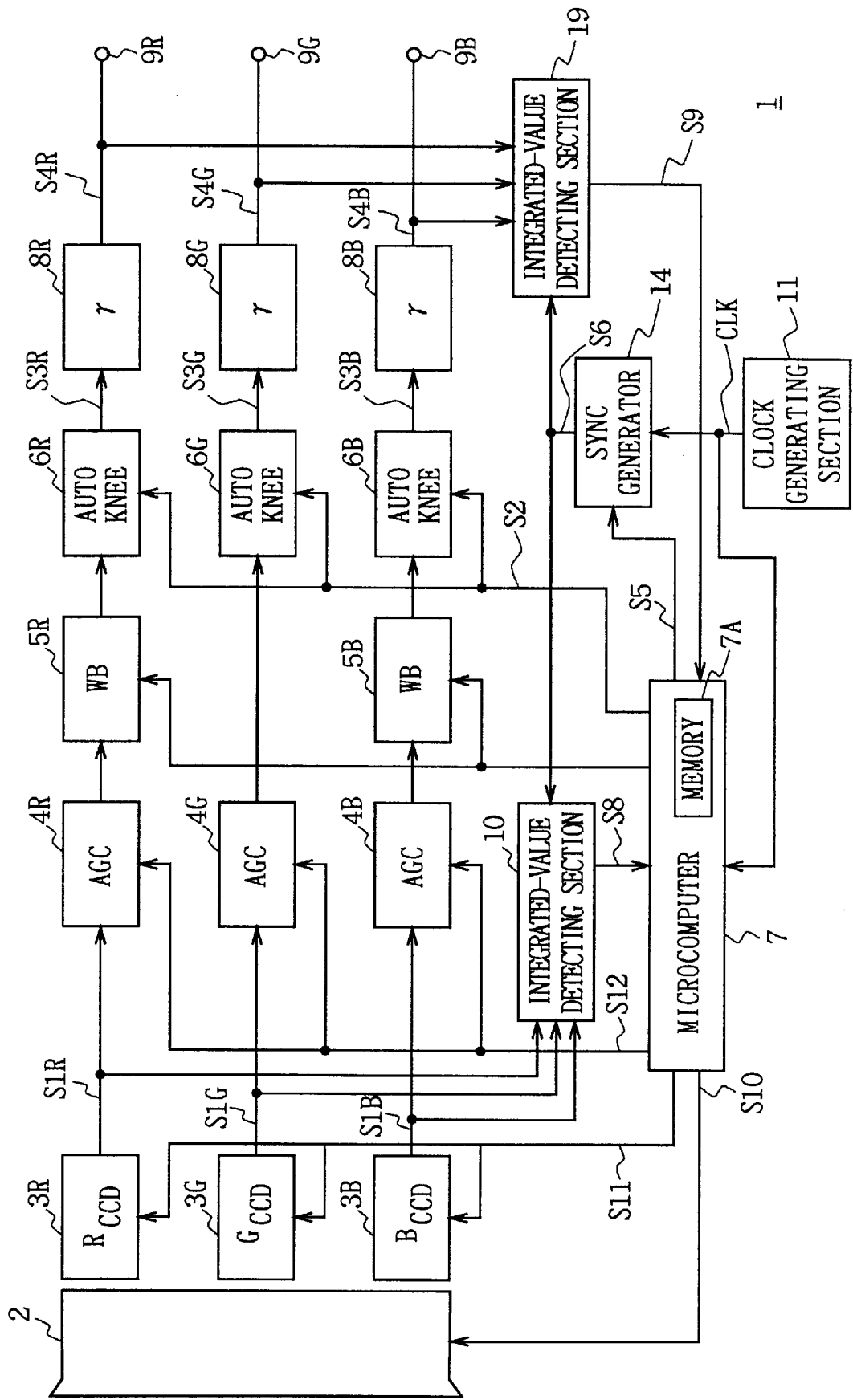
FIG. 2 is a block diagram showing the structure of the video camera of an embodiment of the present invention.

Preferred embodiments of the present invention will be described with reference to the accompanying drawings:

In FIG. 2, the video camera 1 of this embodiment converts the red component, green component, and blue component of the optical image of an object imaged through an optical system 2 on the image pickup surfaces of first to third CCDs (Charge Coupled Devices) 3R, 3G, and 3B into electric signals by the corresponding first to third CCDs 3R, 3G, and 3B.

As a result, a red signal S1R comprising an electric signal corresponding to the red component of the optical image of the object is output from the first CCD 3R and the red signal S1R is supplied to a first auto knee circuit 6R through a first auto gain control amplifier 4R and a first white balance amplifier 5R in order.

Moreover, a green signal S1G comprising an electric signal corresponding to the green component of the optical image of the object is output from the second CCD 3G and the green signal S1G is supplied to a second auto knee circuit 6G through a second auto gain control amplifier 4G.

Furthermore, a blue signal S1B comprising an electric signal corresponding to the blue component of the optical image of the object is output from the third CCD 3B and the blue signal S1B is supplied to a third auto knee circuit 6B through a third auto gain control amplifier 4B and a second white balance amplifier 5B in order.

Figure 1:
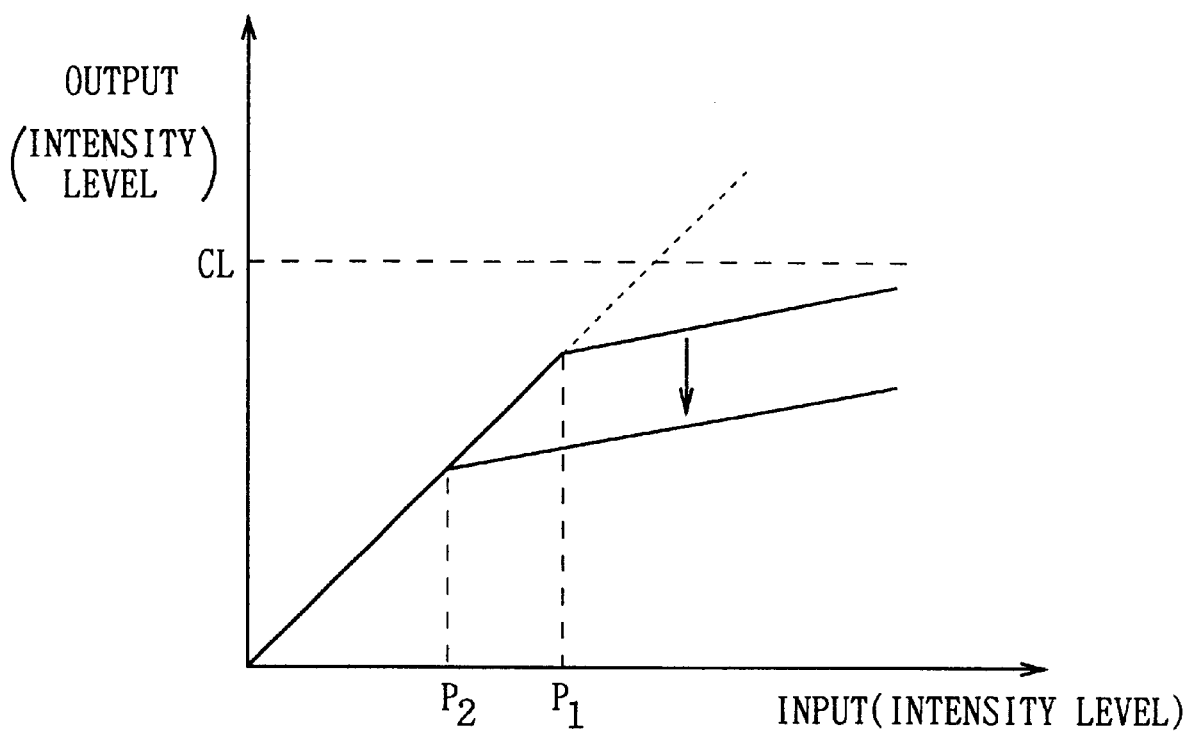
FIG. 1 is a schematic diagram for explaining the adjustment of a knee point in auto knee.

The first to third auto knee circuits 6R, 6G, and 6B apply knee compression to the signals having the intensity level above the knee points in accordance with a control signal S2 supplied from a microcomputer 7 by using the reference levels set by the control signal S2 for the red signal S1R, green signal S1G, and blue signal S1B as the knee points ($P_1$ and $P_2$ in FIG. 1) and transmit knee-processed signals S3R, S3G, and S3B thereby obtained to first to third gamma-control circuits 8R, 8G, and 8B.

The first to third gamma-control circuits 8R, 8G, and 8B apply gamma control to the knee-processed signals S3R, S3G, and S3B and output the obtained red signal S4R, green signal S4G, or blue signal S4B to an external unit through first to third output terminals 9R, 9G, and 9B.

Thus, the video camera 1 outputs the red signal S4R, green signal S4G, and blue signal S4B undergoing white balance adjustment, knee compression, and comma control corresponding to the red component, green component, and blue component of the optical image of the object to an external unit through the first to third output terminals 9R, 9G, and 9B.

Moreover, the red signal S1R, green signal S1G, and blue signal S1B output from the first to third CCDs 3R, 3G, and 3B are also supplied to a first integrated-value detecting section 10. Then, the first integrated-value detecting section 10 detects the red signal S1R, green signal S1G, and blue signal S1B in each divided region obtained by dividing the field screen under control of the microcomputer 7 and transmits the detection results to the microcomputer 7.

Then, operations of the microcomputer 7 are described below. First, a clock CLK synchronizing with the operation clocks of the first to third CCDs 3R, 3G, and 3B is supplied to the microcomputer 7 from a clock generating section 11.

Figure 3:
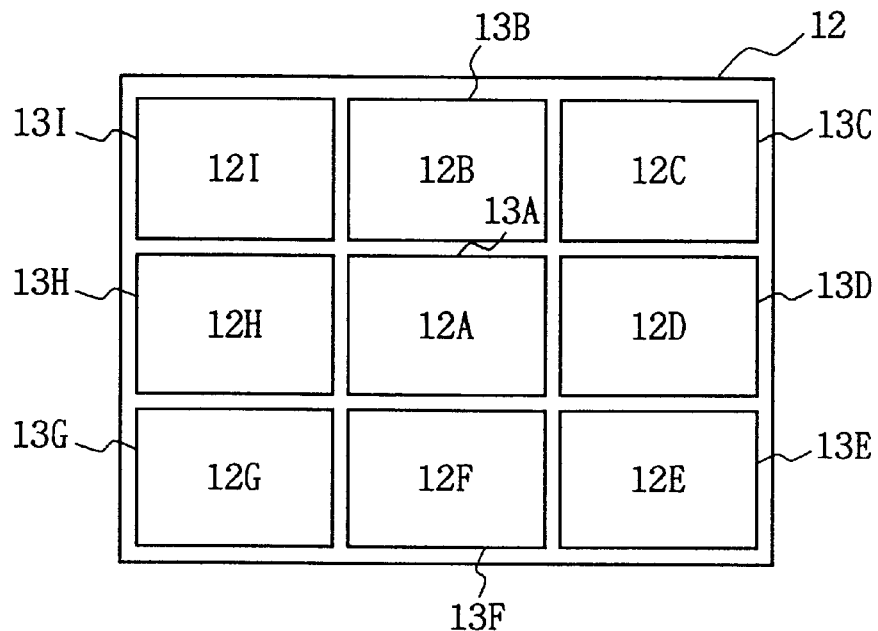
FIG. 3 is a conceptual view for explaining a field screen divided into nine regions.

Then, the microcomputer 7 transmits a divided picture frame designating signal S5 for designating one divided picture frame 13A to 13H or 13I among nine picture frames (hereafter referred to as divided picture frames) 13A to 13I enclosing divided regions 12A to 12I obtained by dividing a field screen 12 into 9 regions shown in FIG. 3 to a sync generator 14 in accordance with the clock CLK. In this case, the microcomputer 7 moves one of designated divided picture frames 13A to 13I in a predetermined sequence for each field and thereby, designates every picture frame 13A to 13H or 13I in a predetermined number of fields.

The sync generator 14 generates a timing signal S6 which becomes high only while the component of divided picture frame 13A to 13H or 13I designated by the microcomputer 7 among the red signal S1R, green signal S1G, and blue signal S1B in accordance with the divided picture frame designating signal S5 supplied from the microcomputer 7 and the clock CLK supplied from the clock generating section 11 is input to the first integrated-value detecting section 10, and transmits the timing signal S6 to the first integrated-value detecting section 10.

Figure 4:
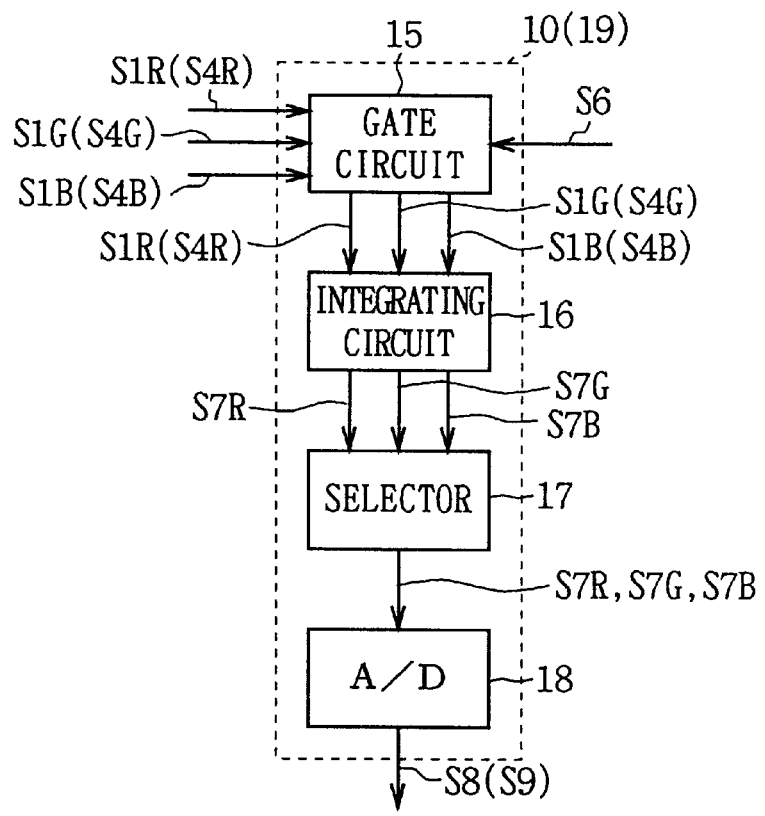
FIG. 4 is a block diagram showing the structures of first and second integrated-value detecting sections.

The first integrated-value detecting section 10 is constituted as shown in FIG. 4, in which the red signal S1R, green signal S1G, and blue signal S1B supplied from the first to third CCDs 3R, 3G, and 3B and the timing signal S6 are input to a gate circuit 15.

Then, the gate circuit 15 transmits the red signal S1R, green signal S1G, and blue signal S1B to an integrating circuit 16 only while the timing signal S6 becomes high. As a result, only the component in the divided picture frame 14A to 14H or 14I designated by the microcomputer 7 among the red signal S1R, green signal S1G, and blue signal S1B output from the first to third CCDs 3R, 3G, and 3B is supplied to the integrating circuit 16.

Then, the integrating circuit 16 individually integrates the red signal S1R, green signal S1G, and blue signal S1B supplied from the gate circuit 15 and successively transmits the obtained integrated values of the red signal S1R, green signal S1G, and blue signal S1B to a selector 17 as a red integrated-value signal S7R, green integrated-value signal S7G, and blue integrated-value signal S7B. The selector 17 successively transmits the red integrated-value signal S7R, green integrated-value signal S7G, and blue integrated-value signal S7B to an analog-digital conversion circuit 18.

The analog-digital conversion circuit 18 digital-converts the red integrated-value signal S7R, green integrated-value signal S7G, and blue integrated-value signal S7B and transmits the data for the obtained integrated-values of the digitized red signal S1R, green signal S1G, and blue signal S1B to the microcomputer 7 as a first in-divided-picture-frame integrated-value signal S8.

Thus, the first integrated-value detecting section 10 detects the integrated values of the red signal S1R, green signal S1G, and blue signal S1B in the divided picture frame 13A to 13H or 13I designated by the microcomputer 7 among the divided picture frames 13A to 13I and transmits the integrated values to the microcomputer 7.

In this case, the microcomputer 7 stores the integrated values of the red signal S1R, green signal S1G, and blue signal S1B in the divided picture frame 13A to 13H or 13I obtained in accordance with the first in-divided-picture-frame integrated-value signal S8 in the first storage regions of memories 7A internally set for the integrated values. That is, nine integrated values for each of the red signal S1R, green signal S1G, and blue signal S1B, that is, the total of 27 integrated values are stored in the first storage regions. In this case, when old data corresponding to each integrated value is stored in the first storage regions through the same preceding processing, new data is overwritten on the integrated value (data is updated).

Moreover, the microcomputer 7 computes the average values of all divided picture frames 13A to 13H and 13I on the red signal S1R, green signal S1G, and blue signal S1B in the divided picture frame 13A to 13H or 13I thus stored in the first storage regions as evaluated values in the regions in the divided picture frames 13A to 13I (that is, divided regions 12A to 12I) and adjusts the gains of the first and second white-balance amplifiers 5R and 5B so that the average value of each of these colors meets the expression (1). The microcomputer 7, in this way, adjusts the white-balance of an output picture.

Figure 5:
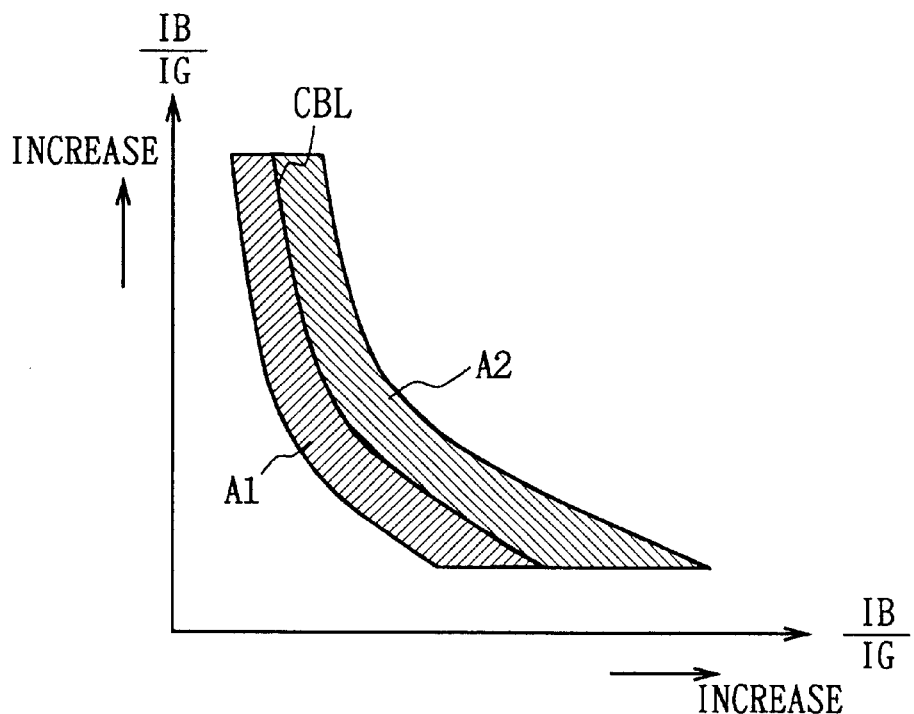
FIG. 5 is a schematic diagram for explaining a blackbody radiation curve and a tracing range.

Moreover, in this case, unless the ratios of average values IR/IG and IB/IG enter the tracing ranges A1 and A2 formed at the both sides of a black-body radiation curve CBL shown in FIG. 5, the microcomputer 7 adjusts the gains of neither first white-balance amplifier 5R nor second white-balance amplifier 5B.

This is because accurate white-balance adjustment cannot be expected when the integrated-value ratios IR/IG and IB/IG are separate from the blackbody radiation curve CBL. Therefore, in the case of the video camera 1, it is possible to always perform optimum automatic tracing white balance adjustment by performing white balance adjustment only when the integrated-value ratios IR/IG and IB/IG are kept in the tracing ranges A1 and A2.

Moreover, the red signal S4R, green signal S4G, and blue signal S4B output from each of the first to third gamma-control circuits 8R, 8G, and 8B are supplied to the gate circuit 15 (FIG. 4) of a second integrated-value detecting section 19 constituted similarly to the first integrated-value detecting section 10. Furthermore, the above timing signal S6 is also supplied to the gate circuit 15 of the second integrated-value detecting section 19 from the sync generator 14. Furthermore, though not illustrated, the sync generator 14 generates a synchronizing signal for controlling the operation timing of each section of the video camera 1 and transmits the signal to each section.

Furthermore, the second integrated-value detecting section 19 detects the integrated values of the red signal S4R, green signal S4G, and blue signal S4B in the divided picture frame 13A to 13H or 13I designated by the microcomputer 7 similarly to the case of the first integrated-value detecting section 19. Furthermore, the data for the integrated values of the red signal S4R, green signal S4G, and blue signal S4B in the divided picture frame 13A to 13H or 13I is supplied to the microcomputer 7 as a second in-divided-picture-frame integrated-value signal S9.

The microcomputer 7 stores the integrated values of the red signal S4R, green signal S4G, and blue signal S4B in the divided picture frame 13A to 13H or 13I obtained in accordance with the second in-divided-picture-frame integrated-value signal S9 in the second storage region of the memory 7A. In this case, when old data corresponding to each integrated value is stored in the second storage region through the preceding same processing, new data is overwritten on the integrated value (data is updated).

Then, the microcomputer 7 adjusts contrast by using the integrated values of the red signal S4R, green signal S4G, and blue signal S4B in the divided picture frame 13A to 13H or 13I thus stored in the second storage region as evaluated values.

In this case, each evaluated value shows the integrated values of the red signal S4R, green signal S4G, and blue signal S4B in the divided picture frame 13A to 13H or 13I, that is, the average intensity levels (average picture levels). Moreover, the difference between the maximum integrated value (average intensity level) and the minimum integrated value (average intensity level) among the integrated values of the divided picture frame 13A to 13H or 13I shows the magnitude of the contrast between the red signal S4R, green signal S4G, and blue signal S4B. Therefore, it is possible to perform automatic contrast adjustment (auto knee) by lowering a knee point when the difference increases and raising the knee point when the difference decreases.

Therefore, the microcomputer 7 generates a control signal S2 for lowering a knee point when the difference between the maximum value and the minimum value of the average intensity levels in the divided picture frames 13A to 13I increases and raising the knee point when the difference decreases and transmits the signal S2 to the first to third auto knee circuits 6R, 6G, and 6B. Thus, the microcomputer 7 adjusts the contrast of an output picture in accordance with the control signal S2.

Moreover, the microcomputer 7 computes an auto-iris signal S10 and control signals S11 and S12 by using some of the integrated values of the red signal S4R, green signal S4G, and blue signal S4B in each of the divided picture frames 13A to 13I stored in the second storage region of the memory 7 as evaluated values, transmits the auto-iris signal S10 to an iris adjusting mechanism (not illustrated) set in an optical system 2, transmits the control signal S11 to the first to third CCds 3R, 3G, and 3B, and moreover transmits the control signal S12 to the first to third auto gain control amplifiers 4R, 4G, and 4B.

Thus, the microcomputer adjusts the iris of the optical system 2, effective exposure times of the first to third CCDs 3R, 3G, and 3B, and gains of the first to third auto gain control amplifiers 4R, 4G, and 4B in accordance with the auto iris signal S10 and control signals S11 and S12 and thus, adjusts the exposure state of an output picture.

Figures 6A, 6B:
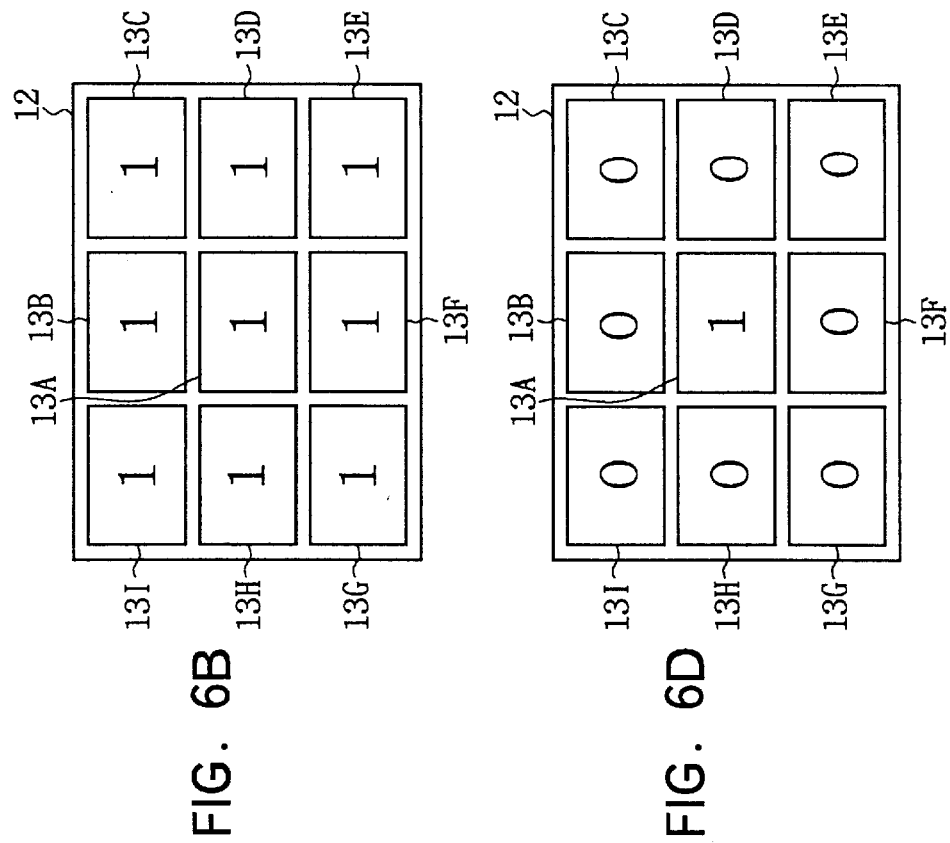
FIGS. 6A to 6D are conceptual views for explaining first to fourth modes of automatic exposure adjustment processing.
Figure 6C:
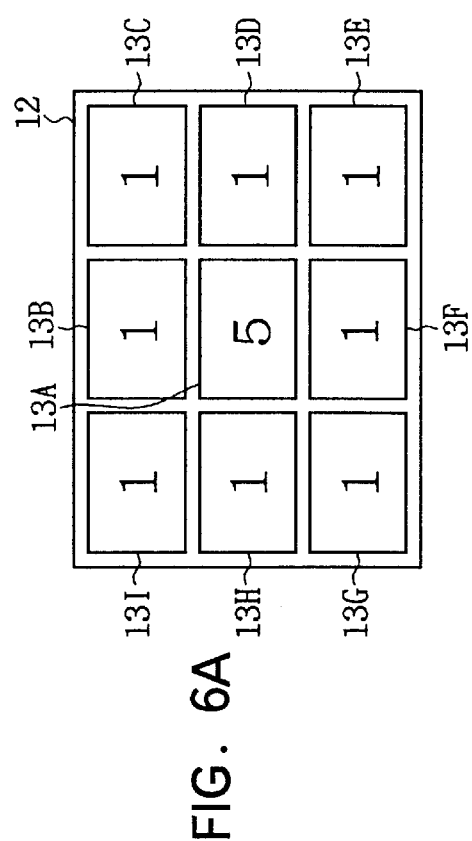
Figure 6D:
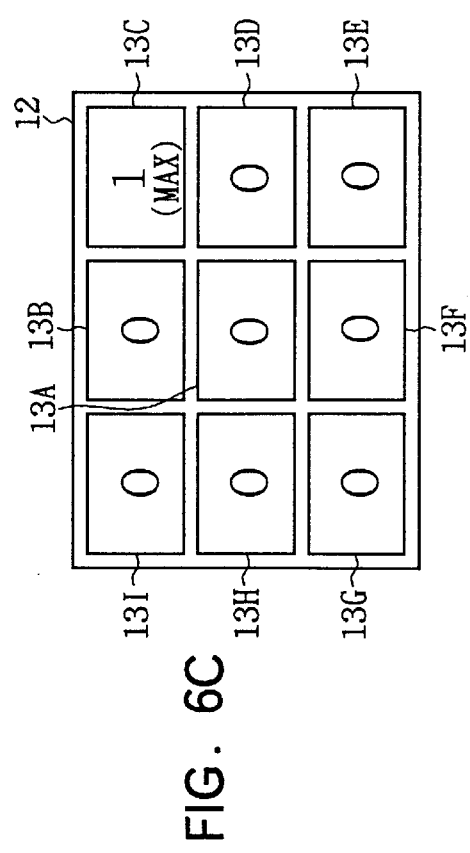

In this case, to decide the auto iris signal S10 and control signals S11 and S12 when adjusting the above exposure state, the video camera 1 of this embodiment has a first mode for weighting the evaluated values for each red signal S4R, green signal S4G and blue signal S4R in the divided picture frames 13A to 13I as shown in FIG. 6A and thereafter, computing the average value of the weighted evaluated values, a second mode for computing the average value of all evaluated values without weighting the evaluated values in the divided picture frames 13A to 13I as shown in FIG. 6B, a third mode for using only the maximum value of the evaluated values in the divided picture frames 13A to 13I, that is, for assigning a weight "1" only to the maximum value and assigning a weight "0" to others as shown in FIG. 6C, and a fourth mode for using the evaluated value in the central divided picture frame 13A as shown in FIG. 6D.

Moreover, the video camera 1 is constituted so that a desired mode among the first to fourth modes can be set through a not-illustrated input setting section and thereby, so that the exposure state of an output picture can be adjusted to an optimum state desired by a user.

Figure 7:
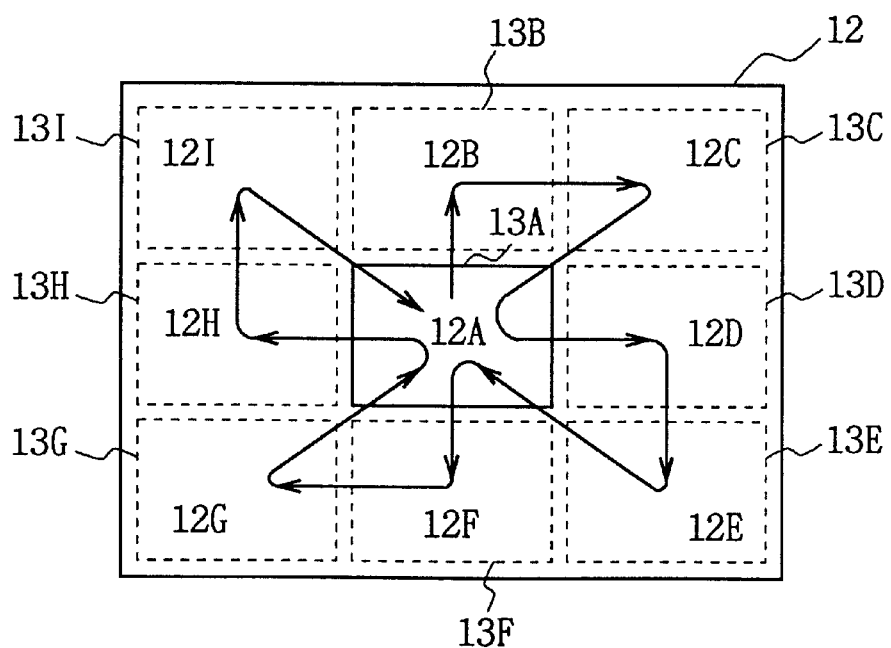
FIG. 7 is a conceptual view for explaining a divided-picture-frame moving sequence.

In this case, the microcomputer 7 actually changes the divided picture frame 13A to 13H or 13I designated, whenever fields are changed, in accordance with the sequence shown by the arrows in FIG. 7 (that is, the sequence of "13A", "13B", "13C", "13A", "13D", "13E", "13A", "13F", "13G", "13A", "13H", and "13I"). Thereby, the microcomputer 7 can obtain the integrated values of the red signals S1R and S4R, green signals S1G and S4G, and blue signals S1B and S4B in all divided regions 12A to 12I for 12 fields.

Figure 8:
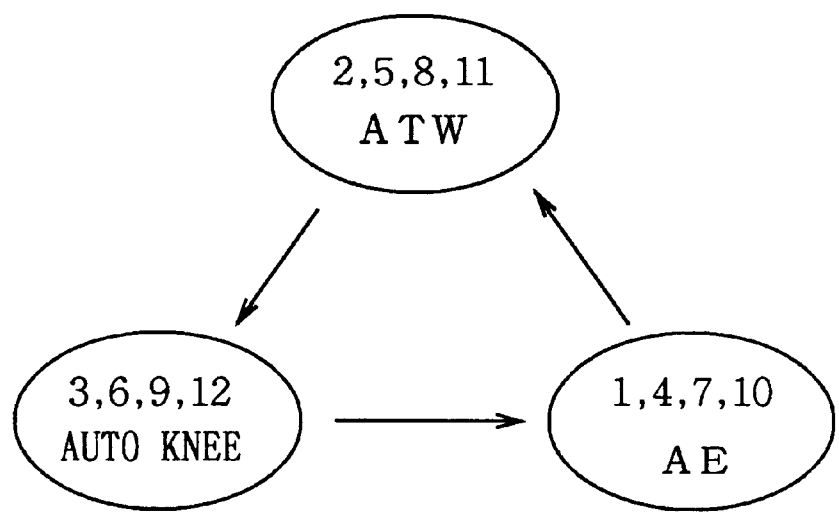
FIG. 8 is a conceptual view for explaining the timing of each automatic adjustment processing.

Moreover, the microcomputer 7 executes the programs for the previously-input automatic exposure adjustment processing, automatic white balance adjustment processing, and automatic contrast (auto knee) adjustment processing in accordance with their predetermined sequence. For example, as shown in FIG. 8, the microcomputer 7 performs automatic exposure adjustment processing in the blanking periods of first, fourth, seventh, and tenth fields, performs automatic white-balance adjustment processing in the blanking periods of second, fifth, eighth, and eleventh fields, and performs automatic contrast adjustment (auto knee) processing in the blanking periods of third, sixth, ninth, and twelfth fields among 12 field cycles.

Thereby, in the case of the video camera 1, hunting does not easily occur and exposure states, white balances, and contrasts are naturally changed up to end by performing each of the automatic exposure adjustment processing, automatic white-balance adjustment processing, and automatic contrast adjustment processing every three fields compared to the case of performing these processing every field.

Moreover, in the case of the video camera 1, because the above-mentioned respective adjustment processing can be performed in each field blanking period by changing the timing of each adjustment processing, it is possible to prevent the troubles that exposure states, white balances, and contrasts are changed depending on the position in one sheet of pictures or a control signal for the microcomputer 7 and circuits to be controlled (e.g., first to third auto gain control amplifiers 4R, 4G, and 4B, first and second white balance amplifiers 5R and 5B, and first to third auto knee circuits 6R, 6G, and 6B) and a response signal for the control signal from each circuit mix in the red signals S1R, S4R, green signals S1G and S4G, and blue signals S1B and S4B as noises. Thus, it is possible to prevent the quality of an output picture from deteriorating due to each adjustment processing.

According to the above structure, the video camera 1 detects the integrated values of the red signal S1R, green signal S1G, and blue signal S1B in each of the divided regions 12A to 12I obtained by dividing the field screen 12 into nine divided regions 12A to 12I by the first and second integrated-value detecting section 10 and 19 in accordance with the timing signal S6 output from the sync generator 14.

Moreover, the microcomputer 7 stores the integrated values of the red signal S1R, green signal S1G, and blue signal S1B in each of the divided picture frames 13A to 13I obtained in accordance with the first divided-picture-frame integrated-value detecting signal S8 output from the first integrated-value detecting section 10 in the first storage region corresponding to the memory 7A and moreover, stores the integrated values of the red signal S4R, green signal S4G, and blue signal S4B in each of the divided picture frames 13A to 13I obtained in accordance with the second divided-picture-frame integrated-value detecting signal S9 output from the second integrated-value detecting section 19 in the second storage region corresponding to the memory 7A.

Furthermore, the microcomputer 7 adjusts the white balance by adjusting the gains of the first and second white balance amplifiers 5R and 5B in accordance with the integrated values of the red signal S1R, green signal S1G, and blue signal S1B in each of the divided picture frames 13A to 13I stored in the first storage region of the memory 7A, moreover, adjusts the contrast by adjusting the knee points in the first to third auto knee circuits 6R, 6G, and 6B in accordance with the integrated values of the red signal S4R, green signal S4G, and blue signal S4B in each of the divided picture frames 13A to 13I stored in the second storage region of the memory 7A, and adjusts the exposure state by adjusting the iris of the optical system 2, exposure times of the first to third CCDs 3R, 3G, and 3B, and gains of the first to third auto gain control amplifiers 4R, 4G, and 4B.

Therefore, the video camera 1 does not require a frame memory for obtaining various pieces of control information necessary for each automatic adjustment processing differently from the case of a conventional vide camera and thereby, the structure can be simplified as a whole.

Furthermore, in the case of the video camera 1, the purposed divided picture frames 13A to 13I are successively changed every field to obtain an evaluated value for each automatic adjustment processing in 12 fields. Therefore, it is possible to simplify the structure as a whole compared to the case of dividing a frame screen into a plurality of divided regions, individually setting a circuit to every divided region, and simultaneously detecting the evaluated value for each automatic adjustment processing; for example, the conventional video camera described above.

According to the above structure, it is possible to simplify the structure as a whole and realize a video camera having a simple structure having various automatic adjustment functions because of detecting the integrated values in the divided picture frames 13A to 13I for the red signals S1R and S4R, green signals S1G and S4G and blue signals S1B and S4B while successively moving the positions of the divided picture frames 13A to 13I so that the control data for each automatic adjustment processing in 12 fields can be obtained and performing white balance adjustment, contrast adjustment, and exposure adjustment in accordance with the integrated values of the red signals S1R and S4R, green signals S1G and S4G, and blue signals S1B and S4B in the obtained divided picture frames 13A to 13I.

For the above embodiment, a case is described in which the present invention is applied to the analog-type video camera 1. However, the present invention is not restricted to the above case. It is also possible to widely apply the present invention to digital-type video cameras.

Moreover, for the above embodiment, a case is described in which the positions and shapes of the divided picture frames 13A to 13I are selected so as to enclose the divided regions 12A to 12I obtained by dividing the field screen 12 into nine regions. However, the present invention is not restricted to the above case. It is possible to widely use various positions and shapes for the positions and shapes of the divide picture frames 13A to 13I. In this case, it is also possible to set the divided picture frames 13A to 13I so that they are overlapped each other.

Figure 9:
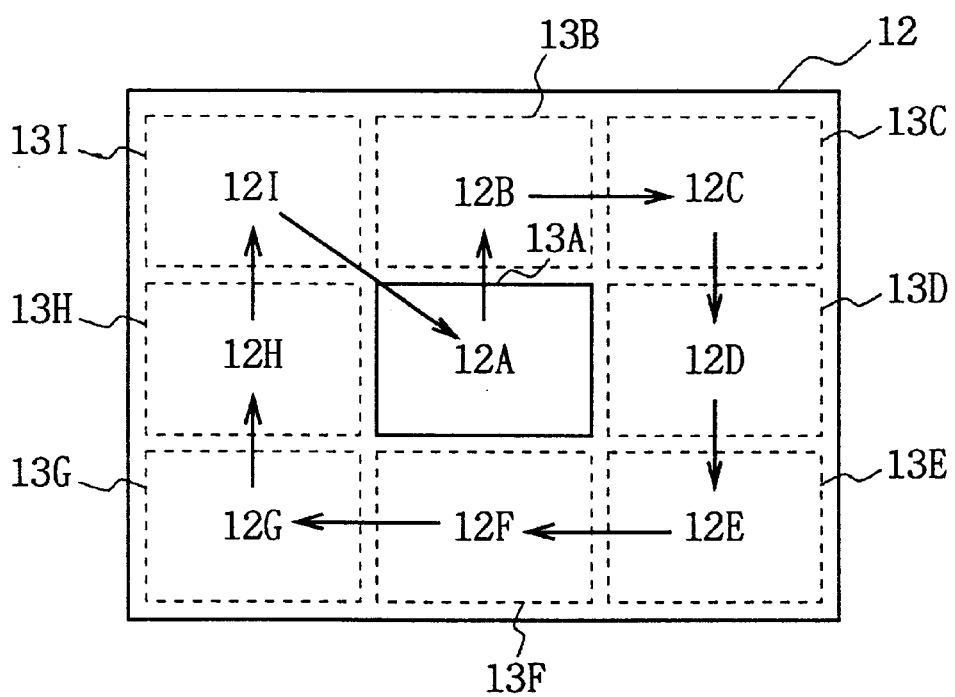
FIG. 9 is a conceptual view for explaining another embodiment.

Furthermore, for the above embodiment, a case is described in which the microcomputer 7 designates the divided picture frames 13A to 13I in accordance with the sequence shown by the arrows in FIG. 7. However, the present invention is not restricted to the above case. It is also possible to designate the divided picture frames 13A to 13I in accordance with the sequence shown by the arrows in FIG. 9 (the sequence of "13A", "13B", "13C", "13D", "13E", "13F", "13G", "13H", and "13I"). As the designated sequence of the divided picture frames 13A to 13I, it is possible to widely apply various sequences.

However, by designating the divided picture frames 13A to 13I in accordance with the sequence shown in FIG. 7, it is possible to obtain the integrated values of the red signals S1R and S4R, green signals S1G and S4G, and blue signals S1B and S4B in the central divided region 12A once every three fields. Therefore, when an object is present at the center (most cases conform to the above case), it is possible to improve the following characteristic of automatic exposure adjustment. Moreover, it is possible to preponderantly detect the integrated values of the red signals S1R and S4R, green signals S1G and S4G, and blue signals S1B and S4B in the divided regions 12B to 12I except the central divided region 12A. Thereby, it is possible to perform each automatic adjustment processing putting stress on the divided regions 12B to 12I.

Furthermore, for the above embodiment, a case is described in which the microcomputer 7 performs automatic exposure adjustment processing in the blanking periods of the first, fourth, seventh, and tenth field screens 12, automatic white-balance adjustment processing in the blanking periods of the second, fifth, eighth, and eleventh field screens 12, and automatic contrast adjustment processing in the blanking periods of the third, sixth, ninth, and twelfth field screens 12 among twelve field cycles. However, the present invention is not restricted to the above case. It is also possible to use various timings as the timings of automatic exposure adjustment processing, automatic white-balance adjustment processing, and automatic contrast adjustment processing.

Furthermore, for the above embodiment, a case is described in which the present invention is applied to the video camera 1 having automatic exposure adjusting function, automatic white-balance adjusting function, and automatic contrast adjusting function. However, the present invention is not restricted to the above case. It is also possible to widely apply the present invention to a video camera having various automatic adjustment functions or other functions.

Furthermore, for the above embodiment, a case is described in which the exposure state of an output picture is adjusted by adjusting the iris of the optical system 2, exposure times of the first to third CCDs 3R, 3G, and 3B, and the gains of the first to third auto gain control amplifiers 4R, 4G, and 4B in accordance with the average value of the integrated values of the red signals S1R and S4R, green signals S1G and S4G, and blue signals S1B and S4B in all divided regions 12A to 12I. However, the present invention is not restricted to the above case. It is also possible to perform backlight correction processing as other automatic exposure adjustment processing by comparing the integrated values of the red signals S1R and S4R, green signals S1G and S4G, and blue signals S1B and S4B in the central divided region 12A with the integrated values of the red signals S1R and S4R, green signals S1G and S4G, and blue signals S1B and S4B in the divided regions 12B to 12I around the region 12A.

Furthermore, for the above embodiment, a case is described in which the microcomputer 7 changes the positions of the divided picture frames 13A to 13I designated in fields. However, the present invention is not restricted to the above case. It is also possible to move the positions of the divided picture frames 13A to 13I every frame or cycle integral multiples larger than a field or frame.

Furthermore, for the above embodiment, a case is described in which the first and second integrated-value detecting sections 10 and 19 detect the integrated values of the red signals S1R and S4R, green signals S1G and S4G, and blue signals S1B and S4B in the same divided region 12A to 12H or 12I in the field screen 12 at the same timing in accordance with the timing signal S6 output from the sync generator 14. However, the present invention is not restricted to the above case. It is also possible that the first and second integrated-value detecting sections 10 and 19 detect the integrated values of the red signals S1R and S4R, green signals S1G and S4G, and blue signals S1B and S4B in accordance with different timing signals, different timings, different sequences, different cycles, and so on.

Furthermore, for the above embodiment, a case is described in which the first and second integrated-value detecting sections 10 and 19 are used one each. However, the present invention is not restricted to the above case. It is also possible to use a plurality of sets of the first and second integrated-value detecting sections 10 and 19, transmitting the timing signal S6 for designating the divided picture frame 13A to 13H or 13I different from each other to each set of the first and second integrated-value detecting sections 10 and 19 from the sync generator 14, and detecting the integrated values of the red signals S1R and S4R, green signals S1G and S4G, and blue signals S1B and S4B in the corresponding divided picture frame 13A to 13H or 13I in each set of the first and second integrated-value detecting sections 10 and 19 according to the timing signal S6. Thereby, it is possible to simultaneously obtain the integrated values of the red signals S1R and S4R, green signals S1G and S4G, and blue signals S1B and S4B in the plurality of divided regions 12A to 12I in one field.

Furthermore, for the above embodiment, a case is described in which the first to third CCDs 3R, 3G, and 3B are used as image pickup devices. However, the present invention is not restricted to the above case. It is also possible to widely use various image pickup devices.

In this case, for the above embodiment, a case is described in which the sync generator 14 sets the same-size divided picture frames 13A to 13I every field. However, it is also possible to set divided picture frames having different sizes.

Furthermore, for the above embodiment, a case is described in which the sync generator 14 sets the divided picture frames 13A to 13I so as to cover the entire region of one field screen 12 with twelve fields. However, it is also possible for the sync generator 14 to set divided picture frames so as to cover only necessary regions in one field screen 12.

Figure 10:
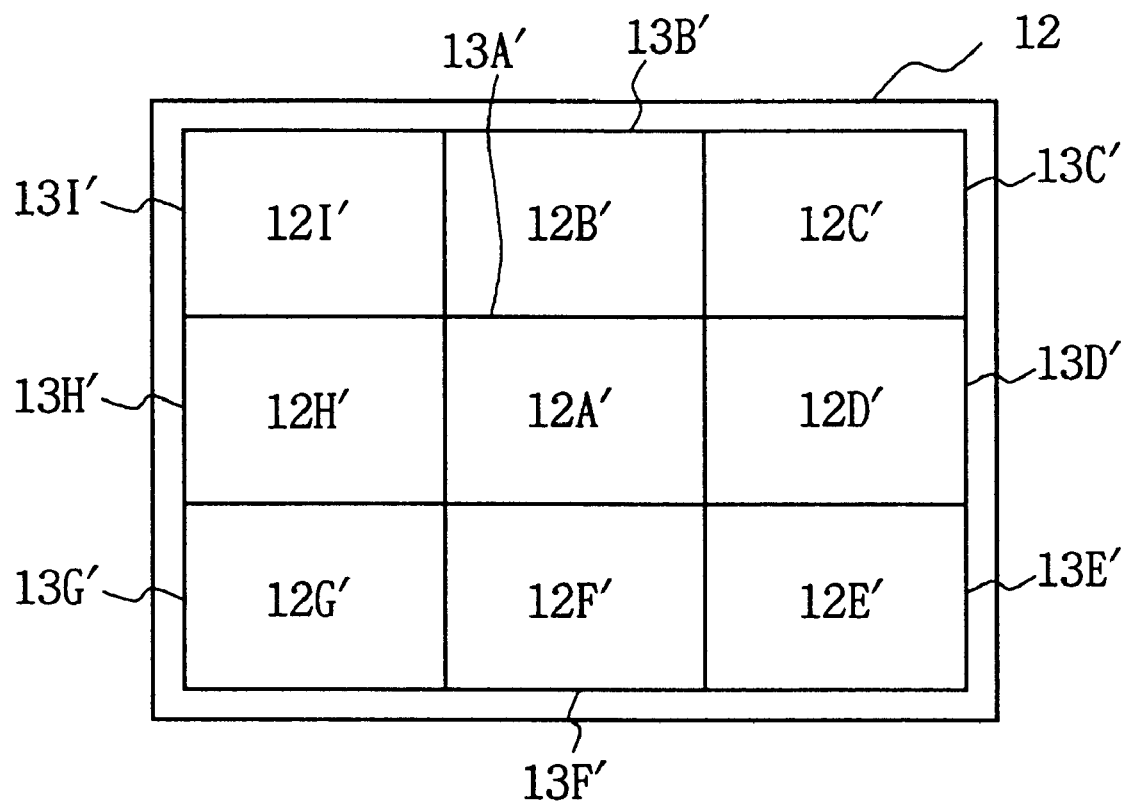
FIG. 10 is a conceptual view for explaining still another embodiment.

Furthermore, for the above embodiment, a case is described in which the sync generator 14 sets the divided picture frames 13A to 13I by separating each other as shown in FIG. 3. However, it is also possible to set divided picture frames 13A' to 13I' without separating each other as shown in FIG. 10.

Furthermore, for the above embodiment, a case is described in which the exposure adjusting function for adjusting an exposure state is constituted with the iris adjusting mechanism provided for the optical system 2, the (exposure times of) the first to third CCDs 3R, 3G, and 3B, and the first to third auto gain control amplifiers 4R, 4G, and 4B. However, the present invention is not restricted to the above case. It is also possible to widely use various structures.

According to the present invention as described above, the video camera system can omit a frame memory for obtaining control information from the output of an image pickup device and a plurality of circuits for dividing a screen into a plurality of regions and simultaneously sampling every divided region. Thereby, a video camera system having a simplified structure can be achieved.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A video camera system comprising:
   an image pickup device providing an output at each of a plurality of predetermined cycles;
   signal processing means for receiving an output of said image pickup device, applying signal processing thereto, and outputting a processed signal;

adjustment control means for performing adjustment processing influencing the output processed signal from said signal processing means in accordance with a control information;

information-obtaining-region setting means for setting at least one information-obtaining region on a screen in accordance with the output of said image pickup device;

information-obtaining-region moving means for moving said at least one information-obtaining-region on said screen for every predetermined frame cycle of the output of said image pickup device, said at least one information-obtaining region corresponding to different information-obtaining-regions of consecutive frames over a plurality of said predetermined cycles;

information-obtaining means for providing obtained region information in accordance with the output of said image pickup device for every predetermined frame cycle of said output in said at least one information-obtaining region, said obtained region information being obtained from different information obtaining-regions of consecutive frames over said plurality of said predetermined cycles so that obtained region information from all of said information-obtaining regions of said consecutive frames is combined to form a complete image; and control-information generating means for generating said control information in accordance with said obtained-region information.

2. The video camera system according to claim 1, wherein said information-obtaining-region setting means sets a plurality of information-obtaining regions by dividing said screen into a plurality of regions.

3. The video camera system according to claim 2, further comprising:

integrated value determining means for determining an integrated value for each component color of each of said plurality of divided regions of said screen; wherein said control-information generating means generates said control information in accordance with at least one of said integrated values determined for each of said plurality of divided regions.

4. The video camera system according to claim 3, wherein said plurality of information-obtaining regions are the same as said plurality of divided regions.

5. The video camera system according to claim 1, wherein said information-obtaining-region moving means successively moves said at least one information-obtaining region for every predetermined cycle of the output of said image pickup device, so each of said at least one of said information-obtaining regions on said screen is used as said information-obtaining region during an integral multiple of said predetermined cycles of the output of said image pickup device.

6. The video camera system according to claim 5, wherein said information-obtaining region moving means moves said at least one information-obtaining region so that said at least one information-obtaining region is located near the center of said screen more frequently than being located adjacent an edge of said screen.

7. The video camera system according to claim 1, wherein each of said predetermined cycles of the output of said image pickup device is equal to one field period of the output of said image pickup device.

8. The video camera system according to claim 1, wherein said information-obtaining means provides the average picture level of outputs of said image pickup device of said at least one information-obtaining region during each of said plurality of predetermined cycles as said obtained-region information.

9. The video camera system according to claim 8, wherein said information-obtaining-region setting means sets each of said information-obtaining regions by dividing said screen into a plurality of equal-size regions.

10. The video camera system according to claim 9, wherein said information-obtaining-region setting means sets each of said information-obtaining regions by dividing said screen into nine regions.

11. The video camera system according to claim 1, wherein said adjustment control means is a white-balance adjusting means for adjusting white balance; and said control-information generating means generates information for controlling said white-balance adjusting means.

12. The video camera system according to claim 11, wherein said information-obtaining means provides said obtained-region information from the output of said image pickup device prior to said output being input to said signal processing means.

13. The video camera system according to claim 1, wherein said adjustment control means comprise exposure adjusting means for adjusting the exposed state of said image pickup device; and said control-information generating means generates information for controlling said exposure adjusting means.

14. The video camera system according to claim 13, wherein said information-obtaining means provides said obtained-region information from the output of said signal processing means.

15. The video camera system according to claim 1, wherein said adjustment control means is auto-knee adjusting means for controlling a knee point of a function utilized in said signal processing in accordance with said control information; and said control information generated by control-information generating means is information for controlling said auto-knee adjusting means.

16. The video camera system according to claim 15, wherein said information-obtaining means provides said obtained-region information from the output of said signal processing means.

17. The video camera system according to claim 1, wherein said information-obtaining means provides said obtained-region information by integrating the output of said image pickup device corresponding to said information-obtaining region.

18. The video camera system according to claim 17, wherein said information-obtaining means obtains said obtained-region information from the output of said signal processing means.

19. The video camera system according to claim 1, wherein said information-obtaining means said obtained-region information by integrating the output of said image pickup device in said information obtaining region.

* * * * *